United States Patent
Kono

(10) Patent No.: US 9,726,229 B2
(45) Date of Patent: Aug. 8, 2017

(54) ENGAGING/DISENGAGING MECHANISM OF DUAL CLUTCH

(71) Applicant: Masakatsu Kono, Saitama (JP)

(72) Inventor: Masakatsu Kono, Saitama (JP)

(*) Notice: Subject to any disclaimer, the term of this patent is extended or adjusted under 35 U.S.C. 154(b) by 93 days.

(21) Appl. No.: 14/952,347

(22) Filed: Nov. 25, 2015

(65) Prior Publication Data

US 2016/0153504 A1 Jun. 2, 2016

(30) Foreign Application Priority Data

Nov. 28, 2014 (JP) .................. 2014-241130

(51) Int. Cl.
*F16D 21/06* (2006.01)
*F16D 13/38* (2006.01)
*F16H 3/00* (2006.01)

(52) U.S. Cl.
CPC ........... *F16D 21/06* (2013.01); *F16D 13/385* (2013.01); *F16H 3/006* (2013.01); *F16D 2021/0684* (2013.01)

(58) Field of Classification Search
CPC ................. F16D 2021/0684; F16D 2021/0669
USPC ................ 192/48.9, 85.5, 85.49, 48.609
See application file for complete search history.

(56) References Cited

U.S. PATENT DOCUMENTS

2015/0252856 A1* 9/2015 Hemphill ................ F16D 13/26
192/48.2

FOREIGN PATENT DOCUMENTS

| DE | 903175 | * | 2/1954 |
|---|---|---|---|
| DE | 10 2010 050 070 A1 | | 5/2011 |
| JP | 2005-201372 A | | 7/2005 |
| JP | 2009-281570 A | | 12/2009 |
| JP | 2011-179637 A | | 9/2011 |
| JP | 2011-185412 A | | 9/2011 |
| JP | 2012-220016 A | | 11/2012 |
| JP | 2013-079675 A | | 5/2013 |
| JP | 2014-101892 A | | 6/2014 |

OTHER PUBLICATIONS

European Search Report for EP Patent Application No. 15196437.6, Apr. 1 2016 (6 pages).

* cited by examiner

*Primary Examiner* — Robert A Siconolfi
*Assistant Examiner* — Ryan Dodd
(74) *Attorney, Agent, or Firm* — Konomi Takeshita

(57) ABSTRACT

One of coaxially placed two output shafts which is located on the inner outer side is a first shaft 102, and the other one which is located on the outer side is a second shaft 104. The first shaft 102 projects more than the second shaft 104. A first clutch disk 116 is connected to a projecting portion of the first shaft 102, and a second clutch disk 110 is connected to the second shaft 104 through a sleeve 106. The second shaft 104 and the sleeve 106 are splined to each other, and the sleeve 106 and the second clutch disk 110 are splined to each other. According to this, the sleeve 106 is structurally permitted to move in an axial direction of the engaging/disengaging mechanism, and the first clutch disk 116 is engaged and disengaged by the movement of the sleeve 106 in the axial direction.

4 Claims, 4 Drawing Sheets

ENGAGING/DISENGAGING MECHANISM OF DUAL CLUTCH

FIELD OF THE INVENTION

The present invention relates to a technical field of a clutch provided in a vehicle, and more particularly, to a technical field of a dual clutch having a dual system clutch including an odd-numbered shift stage clutch and an even-numbered shift stage clutch.

RELATED ART

Background of the Invention

In recent years, the following dual clutch becomes popular. That is, in terms of excellent power transmission efficiency, smallness of a shock at the time of shift transmission, and short shift transmission time, an output shaft connected to an odd-numbered gear set and an output shaft connected to an even-numbered gear set are coaxially placed, and transmission of power is switched over with respect to these two output shafts.

Dual clutches of various structures exist. In a dual clutch 40 described in JP 2009-281570 (reference signs used in this publication are used as they are in JP 2009-281570) for example, a first clutch disk 42 and a second clutch disk 43 are placed on both surfaces of a housing 41 to which power from an engine is transmitted, the first clutch disk 42 is connected to a first shaft 12, and the second clutch disk 43 is connected to a second shaft 13 (which is placed coaxially (concentrically) with the first shaft) (see FIG. 2 of JP 2009-281570).

A first pressure plate 44 is connected to a sleeve 27 through a diaphragm spring 46 and an operation plate 44a. If the sleeve 27 is pushed by an actuator (leftward in FIG. 2 of JP 2009-281570), the first pressure plate 44 is moved rightward and according to this, the first clutch disk 42 is pushed against the housing 41. As a result, rotation of the housing 41 is transmitted to the first shaft 12.

A second pressure plate 45 is connected to a sleeve 26 through a diaphragm spring 47. If the sleeve 26 is pushed by the actuator (leftward in FIG. 2 of JP 2009-281570), the second pressure plate 45 is moved leftward and according to this, the second clutch disk 43 is pushed against the housing 41. As a result, rotation of the housing 41 is transmitted to the second shaft 13.

That is, an operation force for engaging and disengaging the clutch connected to one of the coaxially placed two output shafts which is placed on the inner side (the first shaft 12 in JP 2009-281570) is transmitted from outside the clutch connected to the other shaft placed on the outer side (the second shaft 13 in JP 2009-281570), thereby carrying out an engaging/disengaging operation.

According to the engaging/disengaging mechanism of a dual clutch described in JP 2009-281570, however, it is necessary to invert a force in a pushing direction into a force in a pulling direction utilizing a principle of a lever. Further, to transmit a force (operation force) to the first pressure plate 44, it is necessary to place the operation plate 44a such that it covers the second clutch disk 43 and the second pressure plate 45. As a result, a structure of the mechanism becomes complicated and the number of parts is increased. Along with this, maintenance performance is deteriorated and costs are also increased. Further, since the operation plate 44a is placed such that it covers the second clutch disk 43 and the second pressure plate 45, there is a problem that heat of the second clutch disk 43 and the second pressure plate 45 is less prone to be released sufficiently.

SUMMARY OF THE INVENTION

Hence, it is an object of the present invention to provide an engaging/disengaging mechanism of a dual clutch which is capable of transmitting the operation force for engaging and disengaging the clutch connected to one of the coaxially placed two output shafts that is placed on the inner side without transmitting the operation force from outside (outer peripheral side) the clutch connected to the other shaft placed on the outer side, which is simple in structure, which has excellent maintenance performance and excellent radiation performance, and excellent power transmission performance even if a size of the engaging/disengaging mechanism is the same because a diameter of the clutch disk can be designed large.

In order to solve the above issue, according to the present invention, there is provided a dual clutch engaging/disengaging mechanism in which an output shaft connected to an odd-numbered gear set and an output shaft connected to an even-numbered gear set are coaxially placed, and transmission of power is switched over with respect to these two output shafts, wherein one of the two output shafts which is located on an inner side is a first shaft, and the other output shaft which is located on an outer side is a second shaft, the first shaft projecting more than the second shaft, a first clutch disk is connected to a projecting portion of the first shaft, a second clutch disk is connected to the second shaft through a sleeve, the sleeve is coupled in a state where the sleeve rotates together with rotation of the second shaft and the sleeve can relatively move with respect to the second shaft in an axial direction of the engaging/disengaging mechanism, the second clutch disk is coupled in a state where the second clutch disk rotates together with rotation of the sleeve and the second clutch disk can relatively move with respect to the sleeve in the axial direction, and a pressurizing member for pressing the first clutch disk is connected to one end of the sleeve, and an actuator is connected to the other end of the sleeve.

In the present invention, the second shaft and the sleeve, and the sleeve and the second clutch disk are connected to each other through "coupling which rotates in a rotation direction of the mechanism and which can relatively move in an axial direction of the mechanism," e.g., they are double-splined to each other. As a result, since the sleeve is permitted to move in the axial direction, the operation for engaging and disengaging the first clutch disk is transmitted utilizing the movement in the axial direction.

Since such a structure is employed, it is unnecessary to place the transmission member of the operation force for engaging and disengaging the first clutch disk such that the transmission member covers the clutch disk and the pressurizing member (pressure plate) connected to the second shaft. As a result, radiation performance is excellent, the structure of the mechanism is simple and the number of parts thereof is small. Further, since it is unnecessary to place the member for transmitting the operation force for engaging and disengaging the first clutch disk such that the transmission member covers the clutch disk and the pressurizing member (pressure plate) connected to the second shaft, it is easy to visually check the second clutch disk and the pressurizing member (pressure plate) from outside, and the maintenance performance is also enhanced. Further, the clutch disk diameter can be designed large. Therefore, there is a merit that the power transmission performance is excellent even if the size of the mechanism is the same.

Preferably, bearings are placed between the sleeve and the pressurizing member and between the sleeve and the actuator.

Since the gear sets having different speed reduction ratios are connected to the first shaft and the second shaft, the first shaft and the second shaft rotate basically with different rotation numbers. However, by placing the bearings in this manner, a rotation difference therebetween can be absorbed by the bearing portions, and the sleeve itself can move in the axial direction while always rotating in association with the second shaft in accordance with movement of the actuator. That is, power transmission can smoothly be switched (switching between power transmissions of first shaft and second shaft).

By applying the present invention, it is possible to transmit the operation force for engaging and disengaging the clutch connected to the one of the coaxially placed two output shafts that is placed on the inner side without transmitting the operation force from outside the clutch connected to the other shaft placed on the outer side, and it is possible to provide the engaging/disengaging mechanism of a dual clutch which is simple in structure, and which has excellent maintenance performance and radiation performance.

DETAILED DESCRIPTION OF THE INVENTION

A dual clutch 100 having a dual clutch engaging/disengaging mechanism which is one example of an embodiment of the present invention will be described below with reference to the accompanying drawings. Sizes of various portions of the dual clutch are exaggerated in same cases so that the present invention can easily be understood, and please note that the sizes of the various portions of the dual clutch do not always match with the actual sizes. The drawings should be viewed from directions of reference signs, and upward, downward, leftward and rightward directions, as well as a front side and a rear side are based on the directions of the reference signs.

<Structure of Dual Clutch Having Dual Clutch Engaging/Disengaging Mechanism>

Figure 1:
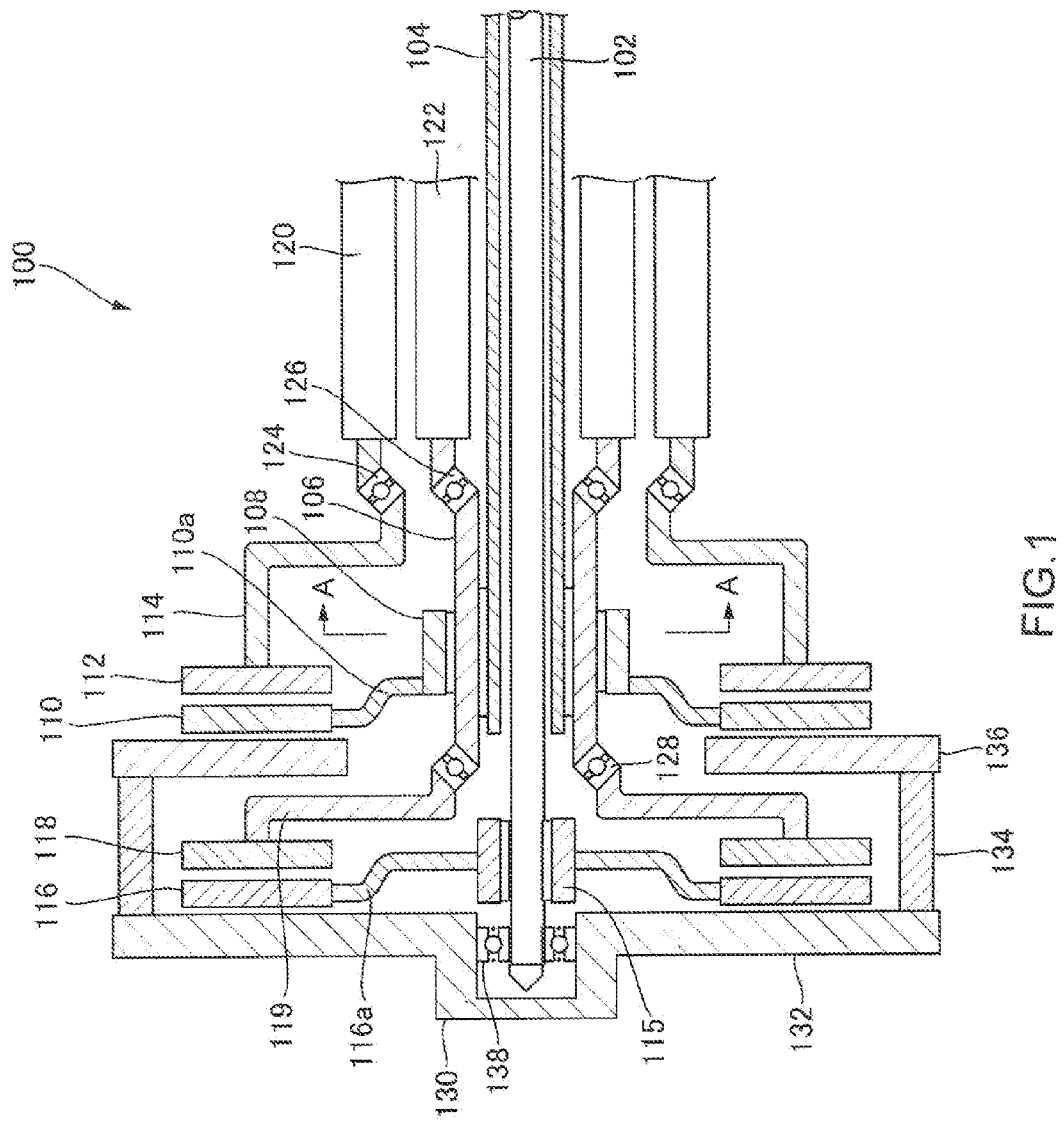
FIG. 1 is a schematic diagram showing a structure of a dual clutch having a dual clutch engaging/disengaging mechanism according to the present invention.

In the dual clutch 100 shown in FIG. 1, an output shaft connected to an odd-numbered gear set and an output shaft connected to an even-numbered gear set are coaxially placed, and the dual clutch 100 is for switching transmission of power from an engine with respect to these two output shafts.

One of the coaxially placed two output shafts which is located on the inner side is a first shaft 102, and the other one located on the outer side is a second shaft 104. The first shaft 102 is placed such that it projects more than the second shaft 104. The odd-numbered gear set may be connected to any of the first shaft 102 and the second shaft 104. Similarly, the even-numbered gear set may be connected to any of the first shaft 102 and the second shaft 104.

A tip end of the first shaft 102 is pivotally or rotatably supported by a rotation member (e.g., flywheel 130) to which power of the engine is transmitted through a radial bearing 138. The flywheel 130 of the embodiment includes a first flywheel disk 132 and a second flywheel disk 136 supported which is by a plurality of columns 134 at a given distance (distance in axial direction) from the first flywheel disk 132. The columns 134 are configured into a columnar shape for example. The second flywheel disk 136 is a member having a doughnut shape. The first flywheel disk and the columns 134, as well as the columns 134 and the second flywheel disk are connected and fixed to each other through bolts for example.

A first clutch disk 116 is placed in the vicinity of the first flywheel disk 132. The first clutch disk 116 is fixed to the first shaft 102 through a first clutch disk link member 116a and a first clutch disk base 115. If the first shaft 102 rotates, the first clutch disk 116 rotates. The first clutch disk 116 separates from the first flywheel disk 132 with a slight gap in its free state.

A first pressure plate 118 is placed on the side of the first clutch disk 116 opposite from the first flywheel disk 132. If a pressing force is applied to the first pressure plate 118 in an axial direction of the mechanism, the first clutch disk 116 is pressed against the first flywheel disk 132 and rotation of the flywheel 130 is transmitted to the first shaft 102.

Similarly, a second clutch disk 110 is placed in the vicinity of the second flywheel disk 136. The second clutch disk 110 is fixed to the second shaft 104 through a second clutch disk link member 110a, a second clutch disk base 108, and a sleeve 106. If the second shaft 104 rotates, the second clutch disk 110 rotates. The second clutch disk 110 separates from the second flywheel disk 136 with a slight gap in its free state.

A second pressure plate 112 is placed on the side of the second clutch disk 110 opposite from the second flywheel disk 136. If a pressing force is applied to the second pressure plate 112 in the axial direction, the second clutch disk 110 is pressed against the second flywheel disk 136 and rotation of the flywheel 130 is transmitted to the second shaft 104. The second pressure plate 112 is connected to a second actuator 120 through a second pressure plate cover 114. The second actuator 120 moves forward and backward in the axial direction. A thrust bearing 124 is placed between the second pressure plate cover 114 and the second actuator 120. Even if the thrust bearing 124 is pulled by the second actuator 120 in the axial direction, the thrust bearing 124 is not disassembled, and a pulling force of the second actuator 120 can be transmitted to the second pressure plate cover 114.

Figure 2:
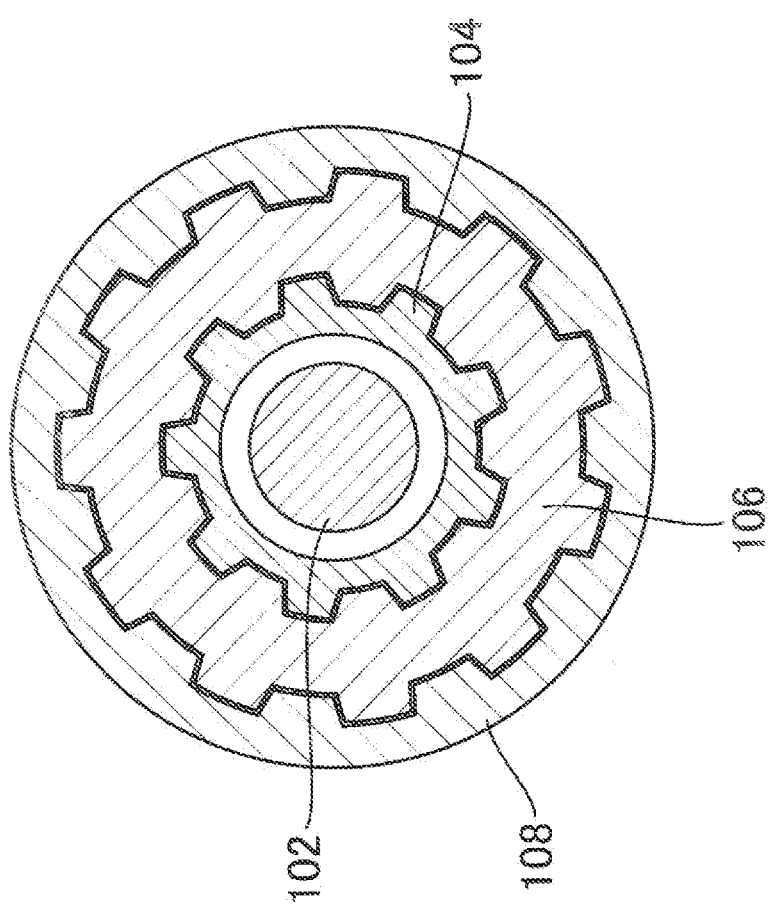
FIG. 2 is a diagram showing an end surface taken along line A-A in FIG. 1.

As described above, the second clutch disk 110 is fixed to the second shaft 104 through the second clutch disk link member 110a, the second clutch disk base 108, and the sleeve 106. The second shaft 104 and the sleeve 106 are splined to each other, and the sleeve 106 and the second clutch disk base 108 are splined to each other (they are fixed in rotation direction but they can relatively move in axial direction) (see FIG. 2). Although these members are splined to each other in this embodiment, any coupling manner may be employed only if they are fixed in the rotation direction and they can relatively move in the axial direction.

One end of the sleeve 106 is connected to a first pressure plate cover 119 through a thrust bearing 128. The other end of the sleeve 106 is connected to a first actuator 122 through a thrust bearing 126. The first actuator 122 moves forward and backward in the axial direction. Even if these thrust bearings 126 and 128 are pulled by the first actuator 122 in the axial direction, the thrust bearings 126 and 128 are not disassembled, and a pulling force of the first actuator 122 can be transmitted to the first pressure plate cover 119.

The sleeve 106 is double-splined to the second shaft 104. According to this, rotation of the second shaft 104 is transmitted to the second clutch disk base 108 through the sleeve 106 and in this state, the sleeve 106 itself can freely move in the axial direction in accordance with forward and backward movement of the first actuator 122.

<Operation and Function of Dual Clutch Engaging/Disengaging Mechanism>

FIG. 1 shows a so-called neutral state. In this state, rotation of the flywheel 130 is not transmitted to any of the first shaft 102 and the second shaft 104.

Figure 3:
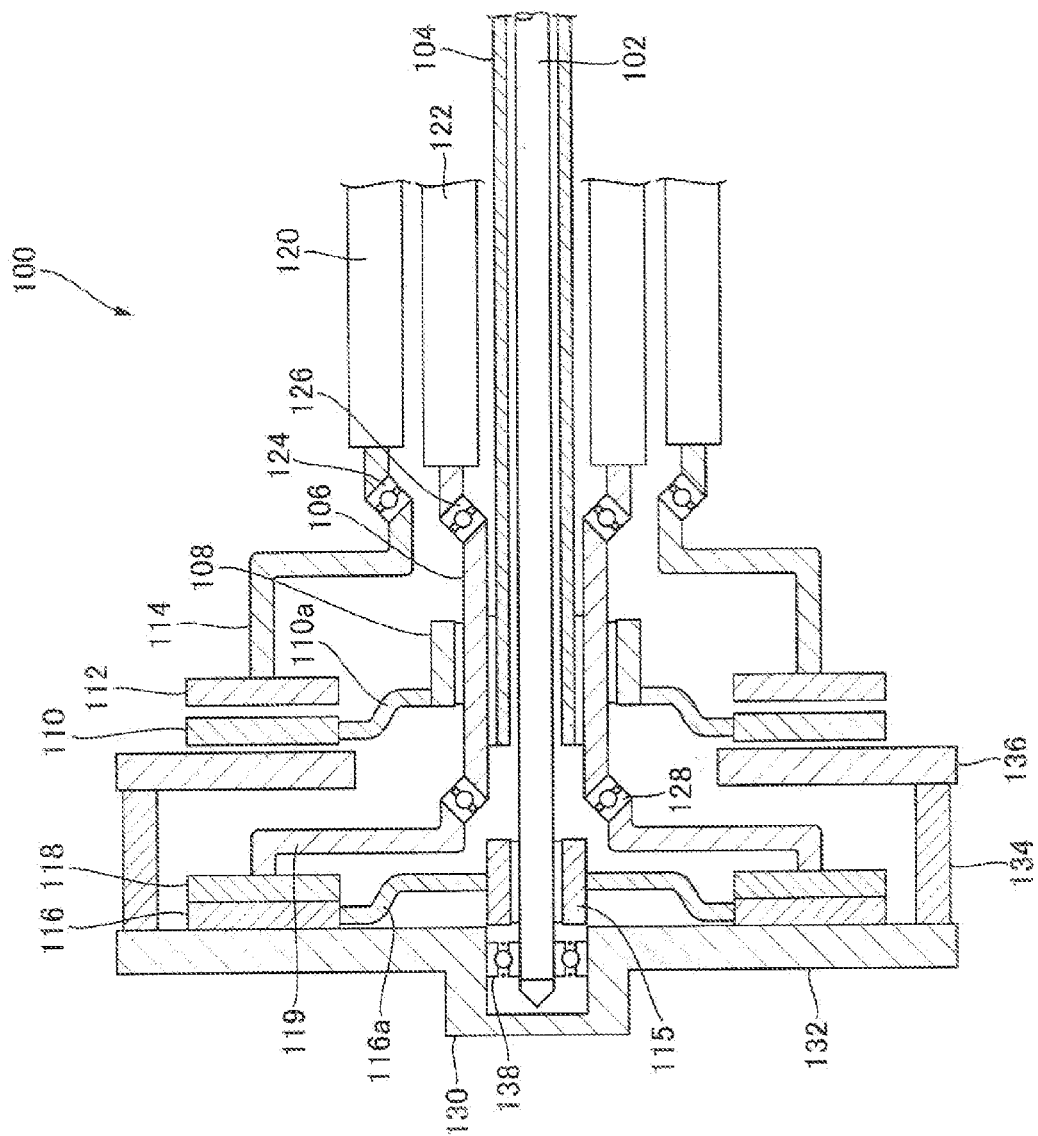
FIG. 3 is a schematic diagram showing the structure of the dual clutch having the dual clutch engaging/disengaging mechanism according to the invention, and showing a state where power is transmitted to a first shaft.

As shown in FIG. 3, if the first actuator 122 operates and moves forward in the axial direction, the first pressure plate 118 moves forward in the axial direction through the thrust bearing 126, the sleeve 106, the thrust bearing 128, and the first pressure plate cover 119, and the first clutch disk 116 is pressed against the first flywheel disk 132. According to this, rotation of the flywheel 130 is transmitted to the first shaft 102.

In a desired stage, it becomes necessary to switch the transmission of power from the first shaft 102 to the second shaft 104. In this case, the transmission of power is switched by moving the first actuator 122 backward and moving the second actuator forward.

Figure 4:
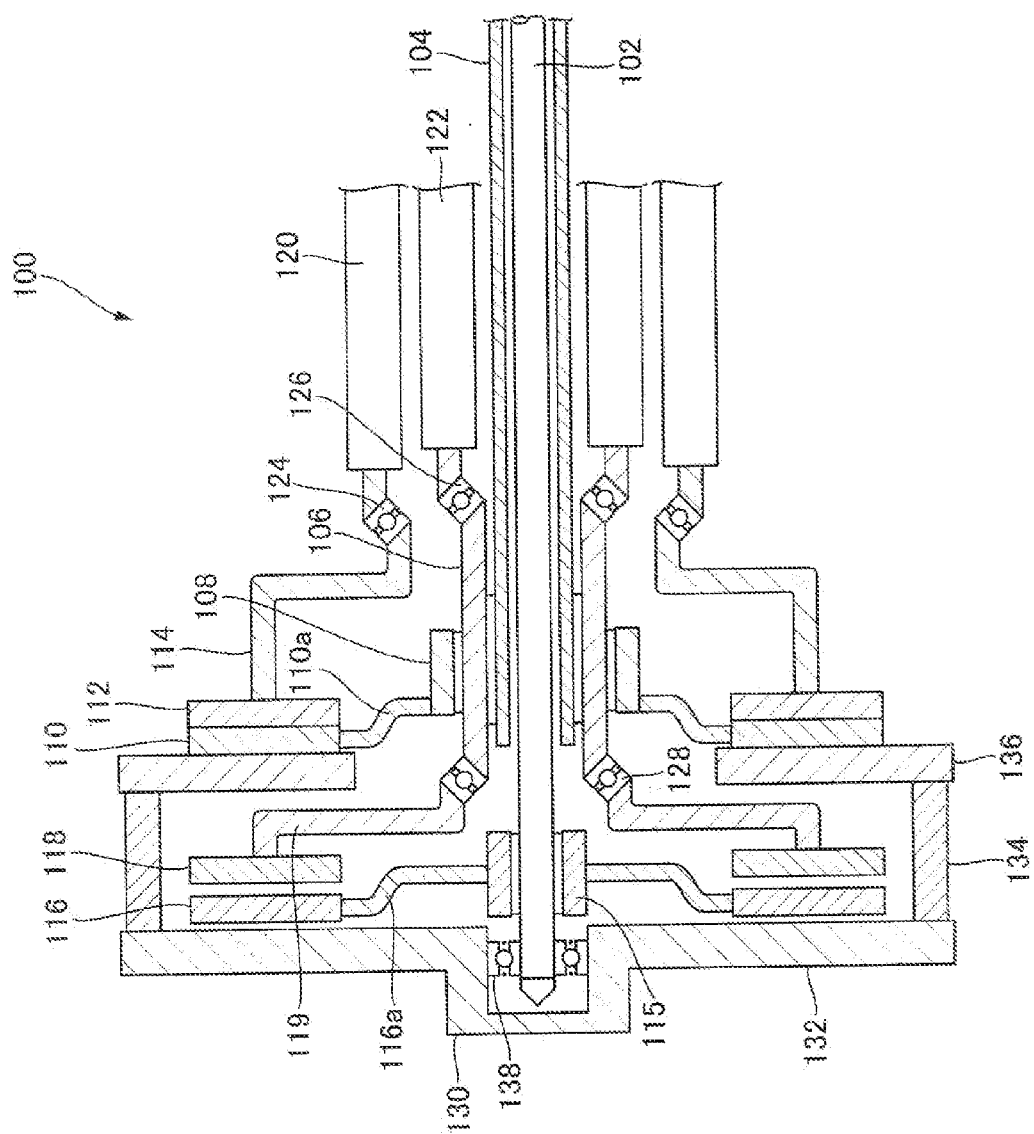
FIG. 4 is a schematic diagram showing the structure of the dual clutch having the dual clutch engaging/disengaging mechanism according to the invention, and showing a state where power is transmitted to a second shaft.

If the second actuator 120 operates and moves forward in the axial direction as shown in FIG. 4, the second pressure plate 112 moves forward in the axial direction through the thrust bearing 124 and the second pressure plate cover 114, and the second clutch disk 110 is pressed against the second flywheel disk 136. According to this, rotation of the flywheel 130 is transmitted to the second shaft 104.

By repeating this operation thereafter, the transmission of power is switched such that rotation of the flywheel 130 is transmitted to any one of the first shaft 102 and the second shaft 104.

The second shaft 104 and the sleeve 106 are splined to each other and the sleeve 106 and the second clutch disk base 108 are splined to each other as described above. In other words, these members are coupled to each other such that "they rotate in the rotation direction of the mechanism and they can relatively move in the axial direction of the mechanism." As a result, since the sleeve 106 is permitted to freely move in the axial direction (thrust direction), an operation force (force for moving first actuator 122 forward and backward) for engaging and disengaging the first clutch disk 116 is transmitted utilizing the axial movement of the sleeve 106.

In other words, the first shaft 102 which is one of the coaxially placed two output shafts and which is located on the inner side projects more than the second shaft 104 located on the outer side, the first clutch disk 116 is connected to the projecting portion of the first shaft 102, the second clutch disk 110 is connected to the second shaft 104 through the sleeve 106, the second shaft 104 and the sleeve 106 are splined to each other, and the sleeve 106 and the second clutch disk 110 are splined to each other. According to this, the sleeve 106 is structurally permitted to move in the axial direction, and the first clutch disk 116 is engaged and disengaged by the movement of the sleeve 106 in the axial direction.

By employing such a configuration, it is unnecessary to place the transmission member of an operation force for engaging and disengaging the first clutch disk 116 such that the transmission member covers the second clutch disk 110 and the pressurizing member (the second pressure plate 112) which are connected to the second shaft 104. As a result, radiation performance is excellent, the mechanism is simple in structure and the number of parts is small. Since it is unnecessary to place the member for transmitting the operation force for engaging and disengaging the first clutch disk 116 such that the transmission member covers the second clutch disk 110 and the pressurizing member (second pressure plate 112) which are connected to the second shaft 104, it is possible to easily visually check the second clutch disk 110 and the pressurizing member (second pressure plate 112) from outside, and maintenance performance is also enhanced. Further, the clutch disk diameter can be designed large. Therefore, there is a merit that the power transmission performance is excellent even if the size of the mechanism is the same.

The thrust bearing 128 is placed between the sleeve 106 and the first pressure plate cover 119, and the thrust bearing 126 is placed also between the sleeve 106 and the first actuator 122.

Since the gear sets (not shown) having different speed reduction ratios are connected to the first shaft 102 and the second shaft 104, the first shaft 102 and the second shaft 104 rotate basically with different rotation numbers. However, by placing the thrust bearings 126 and 128 in this manner, a rotation difference can be absorbed by the bearings 126 and 128, and the sleeve 106 itself can move in the axial direction while always rotating in association with the second shaft 104 in accordance with movement of the first actuator 122. That is, power transmission can smoothly be switched (switching between power transmissions of first shaft 102 and second shaft 104).

Other Structural Examples

The above-described structure is one specific example to which the present invention is applied, and the invention is not limited to the above-described structure. For example, although the clutch on the side of the first shaft and the clutch on the side of the second shaft are of a so-called "single plate" structure in the above-described embodiment, these clutches may be applied to a "multiplate" structure without any problem. Further, although there is no special description in the embodiment, the dual clutch engaging/disengaging mechanism of the present invention may be applied to a dry-type dual clutch and a wet-type dual clutch without any problem.

What is claimed is:

1. A dual clutch engaging/disengaging mechanism in which an output shaft connected to an odd-numbered gear set and an output shaft connected to an even-numbered gear set are coaxially placed, and transmission of power is switched over with respect to these two output shafts, wherein
one of the two output shafts which is located on an inner side is a first shaft, and the other output shaft which is located on an outer side is a second shaft, the first shaft projecting more than the second shaft,
a first clutch disk is connected to a projecting portion of the first shaft, a second clutch disk is connected to the second shaft through a sleeve, the sleeve is coupled in a state where the sleeve is directly fixed to the second shaft in a rotation direction and the sleeve can relatively move with respect to the second shaft in an axial direction of the engaging/disengaging mechanism, the second clutch disk is coupled in a state where the second clutch disk is fixed to the sleeve in the rotation direction and the second clutch disk can relatively move with respect to the sleeve in the axial direction, and a pressurizing member for pressing the first clutch disk is connected to one end of the sleeve, and an actuator is connected to the other end of the sleeve.

2. The dual clutch engaging/disengaging mechanism according to claim 1, wherein bearings are placed between the sleeve and the pressurizing member and between the sleeve and the actuator.

3. The dual clutch engaging/disengaging mechanism according to claim 1, wherein the sleeve is spline-connected to the second shaft.

4. The dual clutch engaging/disengaging mechanism according to claim 1, wherein the second shaft synchronously rotates with the second clutch disk by a spline fitting.

* * * * *